Patented Dec. 27, 1949

2,492,201

UNITED STATES PATENT OFFICE 2,492,201

HYDROXYLATION PROCESS

Daniel Swern, Philadelphia, John T. Scanlan, Wyndmoor, and Thomas W. Findley, Philadelphia, Pa., assignors to the United States of America as represented by the Secretary of Agriculture No Drawing. Application June 7, 1946, Serial No. 675,122

6 Claims. (Cl. 260—406)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for the hydroxylation of unsaturated compounds. More specifically, it refers to a process for the preparation of alpha-glycols by the hydroxylation of mono-unsaturated aliphatic compounds. As used in this disclosure, the term "alpha-glycols" refers to compounds containing two hydroxyl groups attached to adjacent carbon atoms, as illustrated by the formula

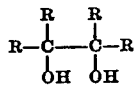

where R is a hydrogen atom or a substituted or unsubstituted aliphatic chain or other substituent.

Alpha-glycols are important intermediates in chemical synthesis. For example, by various well known methods they may be cleaved to yield aldehydes and acids, and by condensation with compounds containing carboxyl groups they yield valuable polymers. Alpha-glycols prepared from unsaturated compounds which contain the carboxyl group, such as oleic and undecylenic acids, are especially valuable since, upon cleavage, these glycols yield dibasic acids as one of their products. The importance of dibasic acids in the preparation of polymers is well known. Long chain aliphatic alpha-glycols and their functional derivatives also have potential value as plasticizers and modifiers in protective coatings, plastics, lubricants, waxes, textile finishing agents, emulsifiers, and so forth.

Various laboratory methods are available for the preparation of alpha-glycols from mono-unsaturated aliphatic compounds, but none of these is suitable for the large-scale, industrial production of alpha-glycols. We have discovered a process for the preparation of alpha-glycols in substantially quantitative yield from mono-unsaturated, aliphatic compounds. This process comprises reacting mono-unsaturated aliphatic compounds with hydrogen peroxide and formic acid, or with performic acid, which performic acid may be added as such, followed by hydrolysis of the hydroxy-formoxy compound which is formed as a result of this reaction. This new process requires no special apparatus and employs chemicals which are readily available. In addition, no undesirable by-products are formed; there are no bulky, inorganic residues to dispose of, such as are encountered in permanganate oxidations; and the volume of the reaction mixture per unit weight of product is only a small fraction of that required for alkaline permanganate oxidations. When an aqueous solution of hydrogen peroxide is mixed with formic acid at room temperature, performic acid is formed rapidly in good yield (Equation 1). No catalyst is required. The performic acid is not very stable and decomposes at the rate of about 4 percent per hour at room temperature. If,

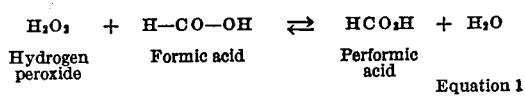

Equation 1 however, a mono-unsaturated, aliphatic compound is already dissolved in the formic acid at the time that the hydrogen peroxide is added, the performic acid, as soon as it is formed, will react with the unsaturated compound (Equation 2), and at no time will this unstable per-acid be present in more than minor quantities. The reaction

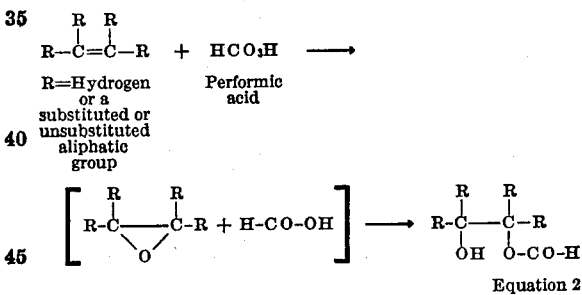

Equation 2 illustrated by Equation 1 is an equilibrium reaction, and as the performic acid is consumed, more will continue to form until the hydrogen peroxide is substantially completely used up. The formate ester, obtained as the reaction product in almost quantitative yield in every case, is hydrolyzed by known methods to the alpha-glycol in quantitative yield (Equation 3).

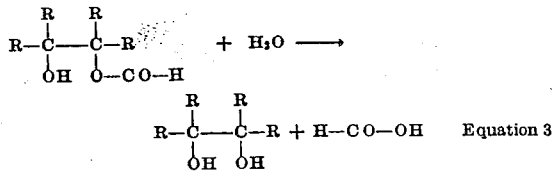

Although it is quite possible that the formate ester is preceded by an epoxy compound as an intermediate (Equation 2), it is not a necessary part of this invention to make this assumption. These hydroxy-formoxy compounds are new.

Reactions in which peroxides are employed as oxidizing agents preferably should proceed fairly rapidly at moderate temperatures to make quantitative utilization of the peroxide feasible; if the reaction proceeds too slowly or the temperature is too high, peroxide decomposition becomes a detrimental factor. The reactions exemplified by Equations 1 and 2 proceed rapidly at moderate temperatures (20° to 40° C.). Thus, by our new process, not only is it possible to obtain a substantially quantitative yield of alpha-glycol in a short time, but only slightly more (2.5 percent) than the stoichiometric amount of hydrogen peroxide is required to achieve this highly desirable end since peroxide decomposition is held to a minimum. Since hydrogen peroxide leaves only water as a by-product, and formic acid is readily recovered, isolation of the reaction products is accomplished without difficulty, and hence, very economically by any of several possible alternative and well known methods.

*Example I.—Preparation of Low-Melting 9,10-Dihydroxystearic Acid from Purified Oleic Acid*

To a well stirred solution of 14.1 grams (0.05 mole) of 99.5 percent oleic acid dissolved in 42.3 ml. of formic acid (98 to 100 percent) at 25° C., 6.90 grams of 25.3 percent hydrogen peroxide (0.0513 mole, 2.5 percent excess) was added in one portion. The temperature was maintained at 40° C. for two hours. The oxidation products were isolated in one of three ways. In runs of this size, the formic acid was recovered by distillation under reduced pressure to yield hydroxy-formoxystearic acid as a distillation residue, or the reaction mixture was poured into cold water, and the product was extracted with ether. Evaporation of the water-washed ether layer yielded hydroxy-formoxystearic acid as a residue. In larger scale preparations (100 grams or more), the reaction mixture was poured into three or more volumes of water. The aqueous layer was discarded and the oil was washed several times with water. By either of the three procedures a substantially quantitative yield of hydroxy-formoxystearic acid was obtained. This was hydrolyzed by heating with an aqueous solution of sodium hydroxide to give a substantially quantitative yield (15.6 grams from 14.1 grams of oleic acid) of 9, 10-dihydroxystearic acid, M. P. about 92° C. Neutralization equivalent: calculated 316.5; found, 315 to 320. Identical results were obtained when 90 percent formic acid was substituted for the 98 to 100 percent grade, although the reaction mixture at no time became homogeneous.

*Example II.—Preparation of Low-Melting 9,10-Dihydroxystearic Acid from Red Oil (Commercial Oleic Acid)*

To a well stirred solution of 99.5 grams of commercial oleic acid (iodine number, 90.4; 0.354 mole of double bond) dissolved in 300 ml. of formic acid at 25° C., 48.8 grams of 25.3 percent hydrogen peroxide (0.363 mole, 2.5 percent excess) was added dropwise over a period of about 15 to 30 minutes. The temperature was maintained at 40° C. for three hours. The subsequent procedure was substantially the same as that described in Example I. The dihydroxystearic acid (107 grams) obtained from this impure starting material contained a large percentage of impurities. The bulk of these impurities could be removed by washing the crude dihydroxystearic acid with petroleum naphtha (hexane fraction, boiling range 63–70° C.) or similar solvent. In this way 90 grams of somewhat impure 9, 10-dihydroxystearic acid, M. P. 82° to 86° C., were obtained. To obtain a more highly purified product, the crude dihydroxystearic acid was crystallized from 95 percent ethanol to yield about 47 grams of fairly pure 9, 10-dihydroxystearic acid, M. P. 92° to 94° C. Neutralization equivalent: found, 316–323.

*Example III.—Preparation of High Melting 9,10-Dihydroxystearic Acid for Elaidic Acid*

To a well stirred mixture of 26.7 grams (0.0915 mole) of 96.8 percent elaidic acid and 80.1 ml. of formic acid at 40° C., 12.5 grams of 25.5 percent hydrogen peroxide (0.0938 mole, 2.5 percent excess) was added dropwise. The temperature was maintained at 40° C. for two hours. The subsequent procedure was substantially the same as that described in Example I. A substantially quantitative yield (29 grams) of 9, 10-dihydroxystearic acid, M. P. about 128° C., was obtained. Neutralization equivalent: found, 315 to 320.

*Example IV.—Preparation of Dihydroxyoctadecanol from Oleyl Alcohol*

To a well stirred solution of 13.4 grams (0.0491 mole) of 98 percent oleyl alcohol dissolved in 40.2 ml. of formic acid at 25° C., 6.65 grams of 25.7 percent hydrogen peroxide (0.0503 mole, 2.5 percent excess) was added. The temperature was maintained at 40° C. for two and one-half hours. The subsequent procedure was substantially the same as that described in Example I. A quantitative yield (15 grams) of dihydroxyoctadecanol was obtained.

*Example V.—Preparation of 9,10,12-Trihydroxystearic Acid from Methyl Ricinoleate*

To a well stirred solution of 15.6 grams (0.0508 mole) of 98.4 percent methyl ricinoleate dissolved in 47 ml. of formic acid at 25° C., 6.95 grams of 25.44 percent hydrogen peroxide (0.0520 mole, 2.5 percent excess) was added. The temperature was maintained at 40° C. for three hours. The subsequent procedure was substantially the same as that described in Example I. An almost quantitative yield (16.5 grams) of trihydroxystearic acid was obtained. Neutralization equivalent: calculated, 332.5; found, 331.

*Example VI.—Preparation of 10,11-Dihydroxyhendecanoic Acid from Hendecenoic (Undecylenic, Acid*

To a well stirred solution of 19.5 grams (0.1023 mole, of 96.8 percent undecylenic acid dissolved in 58.5 ml. of formic acid at 25° C., 13.9 grams of 25.6 percent hydrogen peroxide (0.105 mole, 2.5 percent excess) was added. The temperature was maintained at 40° C. for four hours. The reaction mixture was poured into water and the product was extracted with ether. The ether solution was washed until neutral, dried over anhydrous calcium sulfate and filtered. Evaporation of the ether gave a substantially quantitative yield of hydroxy-formoxyhendecanoic acid. This was saponified with an excess of 1 N sodium hydroxide for one hour at 100° C., and the resulting soap solution was cooled to 20° C. It was then poured with stirring into an excess of 1 N hydrochloric acid maintained at 20° C. by the addition of ice, and the acidified mixture was cooled to 0° C. The precipitate was separated by filtration and air-dried. It weighed 15 grams and consisted of 10,11-dihydroxy-hendecanoic acid. Neutralization equivalent: calculated, 218; found, 220.

*Example VII.—Preparation of Low-Melting 9,10-Dihydroxystearic Acid from Purified Oleic Acid*

Performic acid was prepared by dissolving 22.52 grams of 23.2 percent hydrogen peroxide in 241 grams of formic acid. The solution was allowed to stand at room temperature (28° C.) for about one hour, at which time an analysis indicated that an 81 to 83 percent yield of performic acid had been obtained. To 258 grams of this performic acid solution, 29.5 grams of 95 percent oleic acid was added. The temperature was maintained at 26° to 30° C., with good stirring, for one hour. The subsequent procedure was substantially the same as that described in Example I. An almost quantitative yield of hydroxy-formoxystearic acid hydrolyzable in quantitative yield to 9,10-dihydroxystearic acid, M. P. about 92° C., was obtained.

*Example VIII.—Preparation of Octanediol*

To a well stirred solution of 56 grams (0.5 mole) of 1-octene dissolved in 168 ml. of formic acid at 25° C., 81.2 grams of 21.5 percent hydrogen peroxide (0.5125 mole, 2.5 percent excess) was added. The temperature was maintained at 40° C. for about 8 hours. The subsequent procedure was substantially the same as that described in Example I. Approximately 50 grams of octanediol was obtained.

*Example IX.—Preparation of Octadecanediol*

To a well stirred solution of 50.6 grams (0.2 mole) of 1-octadecene dissolved in 304 ml. of formic acid at 25° C., 28.0 grams of 25.54 percent hydrogen peroxide (0.21 mole, 5 percent excess) was added. The temperature was maintained at 40° C. for about 24 hours. The subsequent procedure was substantially the same as that described in Example I. Approximately 56 grams of octadecanediol was obtained.

*Example X.—Preparation of Hexadecanediol*

1-hexadecene (45 grams) was employed instead of octadecene, as described in Example IX. Approximately 51 grams of hexadecanediol was obtained.

The conditions of time and temperature disclosed in the examples are not intended to limit the invention. Other conditions are satisfactory provided that peroxide decomposition is not unduly accelerated. Also, although we have found that a 2.5 percent molar excess of hydrogen peroxide is satisfactory, other proportions of hydrogen peroxide may be employed successfully. In addition, although we have used hydrogen peroxide of 25 percent concentration in the examples given, other concentrations may be used with satisfactory results. Also, the ratio of formic acid to unsaturated compound may be varied within wide limits. The methods employed for isolating the reaction products are also amenable to variation to suit the size of the batch and the starting material. We have usually used ethyl ether to extract the oxidation products, but other solvents are satisfactory. Likewise, the methods described in this disclosure are applicable to the hydroxylation of other mono-unsaturated compounds such as ethylene, propylene, amylene, decene, dodecene, tetradecene and the like, palmitoleic acid, hexadecenoic acid, petroselinic acid, vaccenic acid, ricinelaidic acid and the like, esters of these unsaturated acids, unsaturated alcohols such as hexadecenol, elaidyl alcohol and the like. The method is a general one for the hydroxylation of mono-unsaturated compounds.

Having thus described our invention, we claim:

1. A process for the preparation of alpha-glycols, of the general formula

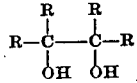

wherein R is a member of the group consisting of hydrogen and organic radicals, which comprises reacting mono-unsaturated compounds of the general formula

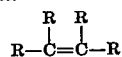

wherein R is defined as above, with a reagent of the group consisting of performic acid and mixtures containing hydrogen peroxide and formic acid, at 20° to 40° C. for not more than a day, the hydrogen peroxide, or hydrogen peroxide equivalent, being present in not more than about 2.5 percent molar excess with respect to the mono-unsaturated compound and hydrolyzing the resulting ester.

2. A process for the preparation of low-melting 9,10-dihydroxystearic acid which comprises reacting oleic acid with hydrogen peroxide and formic acid, at 20 to 40° C. for not more than about two hours, the hydrogen peroxide being present in not more than about 2.5 percent molar excess with respect to the oleic acid and hydrolyzing the resultant ester.

3. A process for the preparation of high-melting 9,10-dihydroxystearic acid which comprises reacting elaidic acid with hydrogen peroxide and formic acid, at 20 to 40° C. for not more than about two hours, the hydrogen peroxide being present in not more than about 2.5 percent molar excess with respect to the elaidic acid, and hydrolyzing the resulting ester.

4. A process for the preparation of 9,10-dihydroxyoctadecanol which comprises reacting oleyl alcohol with hydrogen peroxide and formic acid, at 20 to 40° C. for not more than about two and one-half hours, the hydrogen peroxide being present in more than about 2.5 percent molar excess with respect to the oleyl alcohol, followed by hydrolysis of the resulting ester.

5. A process for the preparation of hydroxy-formoxy compounds of the general formula

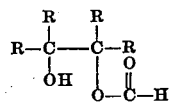

wherein R is a member of the group consisting of hydrogen and organic radicals, which comprises reacting mono-unsaturated compounds of the general formula

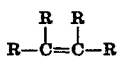

in which R is defined as above, with hydrogen peroxide and formic acid at 20 to 40° C. for not more than a day, the hydrogen peroxide being present in not more than about 2.5 percent molar excess with respect to the mono-unsaturated compound.

6. A process for the preparation of hydroxy-formoxy compounds of the general formula

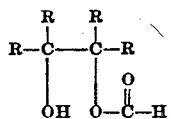

in which R is a member of the group consisting of hydrogen and organic radicals, which comprises reacting mono-unsaturated compounds of the general formula

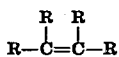

wherein R is defined as above, with a reagent of the group consisting of performic acid and mixtures containing formic acid and hydrogen peroxide at 20° to 40° C. for not more than a day, the hyrogen peroxide, or hydrogen peroxide equivalent, being present in not more than about 2.5 percent molar excess with respect to the mono-unsaturated compound.

DANIEL SWERN.
JOHN T. SCANLAN.
THOMAS W. FINDLEY.

REFERENCES CITED

The following references are of record in the file of this patent:

UNITED STATES PATENTS

| Number | Name | Date |
|---|---|---|
| 2,033,538 | Ralston et al. | Mar. 10, 1936 |
| 2,073,011 | Hubbuch | Mar. 9, 1937 |
| 2,138,917 | Grun | Dec. 6, 1938 |
| 2,304,064 | Scanlan | Dec. 8, 1942 |